(12) United States Patent
Lu et al.

(10) Patent No.: US 11,848,717 B2
(45) Date of Patent: Dec. 19, 2023

(54) PROFILING OF WIRELESS LOCAL AREA NETWORK PERFORMANCE

(71) Applicant: Verizon Patent and Licensing Inc., Arlington, VA (US)

(72) Inventors: Kevin Lu, Bridgewater, NJ (US); Mark M. Massarano, Florham Park, NJ (US); Hamid U. Azizullah, Haymarket, VA (US); Akhil Dayal, Warren, NJ (US); Gary P. Ventriglia, Havertown, PA (US); Ahmed Attoh, Staten Island, NY (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 618 days.

(21) Appl. No.: 16/162,570

(22) Filed: Oct. 17, 2018

(65) Prior Publication Data

US 2020/0127745 A1   Apr. 23, 2020

(51) Int. Cl.
| | |
|---|---|
| *H04B 17/318* | (2015.01) |
| *H04W 48/16* | (2009.01) |
| *H04B 17/10* | (2015.01) |
| *H04W 24/00* | (2009.01) |
| *H04W 72/121* | (2023.01) |
| *H04B 17/391* | (2015.01) |
| *H04W 72/542* | (2023.01) |

(52) U.S. Cl.
CPC ......... *H04B 17/318* (2015.01); *H04B 17/102* (2015.01); *H04B 17/391* (2015.01); *H04W 24/00* (2013.01); *H04W 48/16* (2013.01); *H04W 72/121* (2013.01); *H04W 72/542* (2023.01)

(58) Field of Classification Search
USPC ......................................... 370/252, 310–350
See application file for complete search history.

(56) References Cited

U.S. PATENT DOCUMENTS

| | | | | |
|---|---|---|---|---|
| 9,807,629 | B1 * | 10/2017 | Varlakov | ............... H04W 24/04 |
| 2004/0028003 | A1 * | 2/2004 | Diener | .................. H04L 1/0001 |
| | | | | 370/319 |
| 2015/0304889 | A1 * | 10/2015 | Qian | ................. H04W 72/1289 |
| | | | | 370/235 |
| 2016/0242160 | A1 * | 8/2016 | Liao | ...................... H04W 12/69 |
| 2017/0181015 | A1 * | 6/2017 | Ngo | ..................... H04W 40/244 |
| 2017/0332292 | A1 * | 11/2017 | Ponnuswamy | ..... H04W 72/085 |
| 2018/0242178 | A1 * | 8/2018 | Barton | ................ H04B 17/391 |
| 2018/0249341 | A1 * | 8/2018 | Park | ...................... H04W 16/26 |
| 2018/0310279 | A1 * | 10/2018 | Pathak | .................. H04W 16/10 |
| 2019/0159205 | A1 * | 5/2019 | Mercier | ............ H04W 72/0453 |

\* cited by examiner

*Primary Examiner* — Alpus Hsu
*Assistant Examiner* — Hooman Houshmand

(57) ABSTRACT

A method for profiling the performance of a wireless local area network may include receiving, from a wireless access point (WAP), measurements associated with client devices in a wireless local area network (WLAN), and identifying a dominance of the client devices in the WLAN. The method may further include classifying the received measurements into categories representing channel qualities with the client devices in the WLAN, and transforming the categories of the client devices into values. The method may further include determining a profile of the WLAN based on the values and the dominance of the client devices.

20 Claims, 6 Drawing Sheets

RSSI - DEVICES

| TRIAL | 160-1 | 160-2 | 160-3 | 160-4 | 160-5 |
|---|---|---|---|---|---|
| A | -52 | -50 | -80 | -71 | -60 |
| B | -51 | -50 | -41 | -34 | -38 |

Fig. 6A

MODULATION RATE RATIO - DEVICES

| TRIAL | 160-1 | 160-2 | 160-3 | 160-4 | 160-5 |
|---|---|---|---|---|---|
| A | 90% | 88% | 60% | 78% | 85% |
| B | 88% | 84% | 95% | 100% | 91% |

Fig. 6B

COMBINED WEIGHTED DEVICE RANKINGS

| TRIAL | 160-1 | 160-2 | 160-3 | 160-4 | 160-5 | WLAN 170 PROFILE |
|---|---|---|---|---|---|---|
| A | 14 | 16 | 36 | 5 | 7 | 78 |
| B | 13 | 15 | 52 | 9 | 11 | 100 |

Fig. 6C

PROFILING OF WIRELESS LOCAL AREA NETWORK PERFORMANCE

BACKGROUND

Modern wireless local area networks (LANs) offer convenient access to networking resources, particularly for environments where mobile clients such as, cell phones, tablets, and/or laptop computers, are prevalent. The effort for configuring wireless access points, particularly in facilities having many areas using multiple wireless networks (e.g., universities, conference centers, etc.) and/or having multiple networked resources (e.g., wireless projectors), may be significant. Such efforts may entail the reconfiguration of client devices as they move among different areas within a facility.

BRIEF DESCRIPTION OF THE DRAWINGS

FIGS. 6A-6C are exemplary tables showing inputs and outputs associated with determining the profile of a WLAN.

DETAILED DESCRIPTION OF PREFERRED EMBODIMENTS

The following detailed description refers to the accompanying drawings. The same reference numbers in different drawings may identify the same or similar elements.

In wired networks, network performance is predictable and physical access to a LAN may be precisely controlled on the location of network ports (e.g., RJ-45 sockets). In contrast, wireless local area networks (WLANs) have the significant advantage that physical network access for devices is far less constrained. However, WLAN performance depends on a variety of physical characteristics (such as building structure and materials) and electromagnetic conditions potentially having complex interactions. Accordingly, WLAN quality can be very difficult to analyze, and performance issues are typically problematic to resolve. For users of WLANs, performance issues with WLANs can be a problem point in the user satisfaction for network service providers.

Traditionally, when responding to requests for technical support, service representatives are faced with the difficulty of diagnosing the cause of a user's networking issue based on limited information. In most instances, the user requesting network support has limited technical experience, and may not be able to fully describe what is happening at an endpoint device. Accordingly, the service representative is faced with determining whether the technical issue is the fault of the wide area network (WAN) interfacing with the WLAN, the user's WLAN or the end device. While network service providers have well developed tool sets for analyzing network problems in the WAN, traditional techniques to remotely gain insights into a WLAN for troubleshooting purposes is limited. Embodiments provided herein may improve upon conventional tools by providing insight into a WLAN so that a service representative may profile a wireless access point (WAP) within a WLAN. A profile of a WAP may include generating a numerical value, or "score," which can assist in troubleshooting WLAN problems and provide guidance for improving the performance of a user's wireless network. The WAP profiler thus can also provide tailored recommendations to the user on appropriate remedies to improve the overall WLAN experience.

Figure 1:
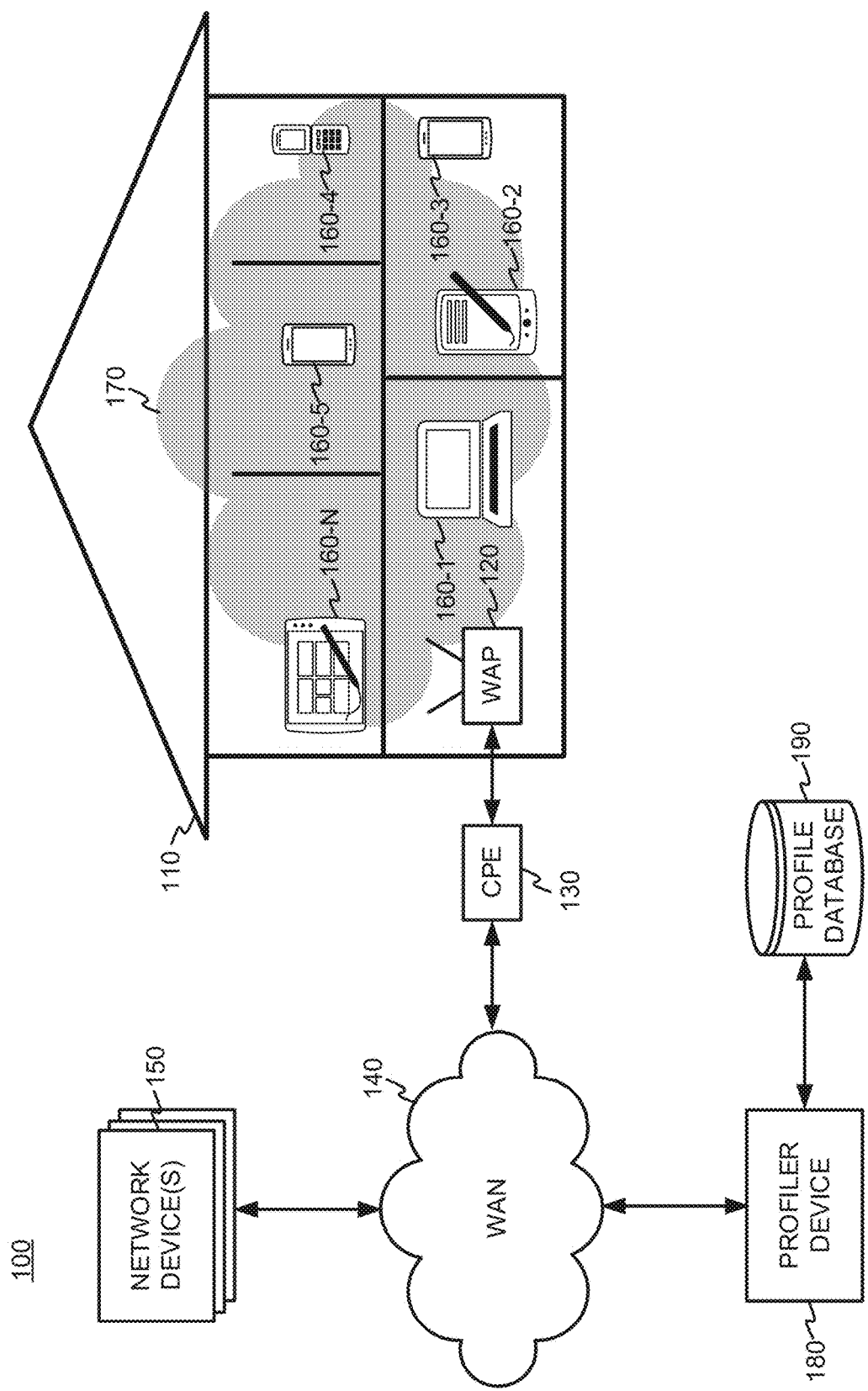
FIG. 1 is a diagram illustrating an exemplary environment within a residence consistent with an embodiment of a wireless access point profiler.

FIG. 1 is a diagram illustrating an exemplary environment 100 within a residence consistent with an embodiment of a WAP profiler. Environment 100 is shown as a home residence by way of example only. It should be understood that environment 100 may be any type of setting having a WLAN that may include, for example, an apartment, an office, an educational facility, manufacturing facility, etc. Environment 100 may include residence or house 110 (referred to generally as "house"), wireless access point (WAP) 120, customer premises equipment (CPE) 130, wide area network (WAN) 140, a network device 150, client devices 160 (also herein referred to plurally as "devices 160" and individually as "device 160-$x$"), a wireless local area network (WLAN) 170, a profiler device 180, and a profile database 190.

Within house 110, WAP 120 may provide wireless networking access to devices 160 via WLAN 170. Through one or more radio channels over WLAN 170, which are established and controlled by WAP 120, devices 160 may exchange data with each other within house 110 and/or around in a limited area exterior to house 110. Additionally, devices 160 may exchange data with one or more network devices 150 via WAN 140. In the embodiment shown in FIG. 1, data exchanges between WAN 140 and WAP 120 may occur through CPE 130, where data may be provided to house 110 via optical backhaul using fiber optic cable, and/or a wireless backhaul using any type or combination of wireless channels. CPE 130 may include, for example, a modem, the physical connection to WAN 140 may be some other wired or wireless mechanisms. Wireless mechanisms may include satellite communication devices, cellular wireless devices (such as, for example, 4G, LTE, 5G, etc.), etc. Other networking hardware which may be included in environment 100, such as, for example, a router, a controller, a dynamic name host configuration protocol (DHCP), etc., are not shown in FIG. 1 for simplicity.

During network communications via WLAN 170, where device 160-$x$ typically exchanges data with one or more network devices 150 over WAN 140, a user may experience unsatisfactory performance with applications running on device 160-$x$ which rely on network connectivity. Some applications may consume significant amounts of network resources, and may require high bandwidths and/or low latencies. Such applications can include, for example, applications for video streaming, voice over internet protocol (VoIP) communications, video conferencing, on-line gaming, etc. It is often difficult to determine the source of poor WLAN 170 performance, as the performance can vary as the user moves about the house, or vary unpredictably over time depending upon interference from other radio sources (such as another wireless network). A user may easily be able to determine that the reason for poor application performance lies with the network (e.g., WLAN 170), but can have great difficulty in diagnosing and improving poor network performance. Thus, the user may contact technical support to resolve the performance issue.

Further referring to FIG. 1, profiler device 180 may be used to remotely diagnose problems with WLAN 170 by creating a profile (also referred to herein as a "score") which characterizes the performance of WAP 120 to provide insight into the user experience of WLAN 170. Profiler device 180 may act as a data collection platform that receives various performance metrics from WAP 120, via CPE 130 and WAN 140, and process the received performance metrics to produce a profile indicating the quality of the performance of the WLAN 170.

A profile may be periodically generated automatically by profiler device 180 over time periods to produce a performance history of WLAN 170, which may be stored in profile database 190. For example, a network operator may generate (i.e., sample) the profile of WLAN 170 a minimum of two times a day for house 110, and record these samples for a minimum of seven days in profile database 190. Stored performance histories may be accessed using profile database 190 to detect trends in network quality for assistance in diagnosing problems. Additionally, stored performance histories may be combined to produce a profile for WAP 120 that adapts over time. In an embodiment, stored performance histories may be analyzed in conjunction with other datasets to discover correlations of WLAN 170 performance with other events.

The time periods for sampling profiles of WAP 120 may be altered manually to assist in long-term performance improvement efforts or may be varied automatically based on variations in performance trends calculated by profiler device 180. Alternatively, profiler device 180 may be invoked manually to generate a profile at the discretion of a technician during an interactive support session. The interactive support session may be conducted during a user support call initiated by the user. Because automatically generated profiles may not be able to precisely locate "dead spots" in WLAN 170 coverage (because profiles may only be generated where the device is being used), interactive support sessions can be especially useful in determining dead spots within house 110, where the technician can instruct the user to move device 160-x to different locations in house 110 and compare profiles generated at the different positions to observe profile trends better understand dead spots in house 110. Diagnosing network issues may include making changes to WAP 120 and generating profile scores to quantify the effect of the changes. The diagnostic process may be performed as the result of a technical support session. The technical support session may involve an automatic process performed by machine, or a process which is performed with the assistance of a technician. For example, one exemplary change to improve WLAN 170 performance is to change the position and/or orientation of WAP 120 so that wireless signals may propagate better throughout house 110.

Referring back to FIG. 1, profiler device 180 may, either automatically or manually, initiate a profiling session with WAP 120 to assess the performance of WLAN 170. During the profiling session, profiler device 180 may receive various input parameters from WAP 120 via CPE 130 and WAN 140. The input parameters may include measurements of the number of packets transmitted by WAP 120 to each of the devices 160 and/or measurements of the number of packets received by WAP 120 from each of the devices 160. Additionally, profiler device 180 may receive a measurement of the power received by WAP 120 from each of the signals transmitted by devices 160, and a measurement of the quality of the wireless channel between WAP 120 and each of the devices 160. As will be discussed in more detail below, the measurement of the power received may take the form of a received signal strength indicator (RSSI), and measurement of the quality of the wireless channel may be based on the modulation coding index scheme (MCS) index negotiated between WAP 120 and each of the devices 160. Profiler device 180 may process the aforementioned input measurements and calculate a profile for WAP 120. The calculation of a profile may include the "dominance" for each of the devices 160 (also referred to herein as "device dominance"). The device dominance may represent the relative "importance" of a particular device 160-x in the computation of a profile. Mathematically, device dominance values may be used as weights when computing a profile so that the profile best reflects the user's perception of WLAN 170 performance.

In an embodiment, the device dominance for a particular device 160-x may be determined by profiler device 180 by computing the ratio of the number of packets transmitted to device 160-x (from WAP 120) divided by the total number of packets transmitted from WAP 120 (to all of the devices 160). Alternatively, a technician may override the profiler device's 180 computation of the device dominance, and manually select a particular device 160-x as the most dominant device for the computation of a profile. The manual selection may be performed when a particular device 160-x is deemed most important by a user in the perception of WLAN 170 performance. For example, in an embodiment a user's computer may be manually selected as the most dominant device in house 110. Details of the process for computing a profile score based on various inputs and the device dominance is described in more detail below in reference to FIG. 4.

In an embodiment, the profile may represent a numerical value, such as a score from 0 to 100. In other embodiments, the profile may be reported in a more qualitative manner, using categories expressing various qualities such as, for example, "excellent," "good," "average," and "poor." Alternative, the profiles may be expressed graphically as a color (e.g., "green" meaning good. "yellow" meaning marginal, or "red" meaning poor) or shape (e.g., graph or gauge) within a user interface generated by profiler device 180. Once calculated, the profile may be stored in profile database 190 so performance trends of WAP 120 may be analyzed over time.

As noted above, the profiler device 180 may generate a profile in a "reactive" manner, which is typically invoked during an interactive technical support session with a user. During the interactive session, the user may be instructed to move a device 160-x around house 110 to observe changes in profile scores reflecting variations in WLAN 170 coverage as a function of position. Additionally or alternatively, different positions and/or orientations of WAP 120 may be tried when calculating a profile to determine what position/orientation produces the highest profile score. Additionally, other changes may be made to WLAN 170, such as, for example, adding a WAP extender (not shown) to improve WLAN 170 coverage. Profiler device 180 may also be used to find a position and/or orientation of the WAP extender which improves WLAN 170 performance. Profiler device 180 may also be used in a "proactive" manner which automatically generates profiles periodically for storage in profile database 190. The profiles generated in a proactive mode may be done periodically at a predefined rate at set periods of time (e.g., every 12 hours, collect 30 minutes of measurements) to create profile histories to diagnose trends in performance.

Referring back to FIG. 1, WAP 120 may be any type of wireless access point that may be used for establishing a WLAN 170. While not shown, WAP 120 may be integrated with a router, DHCP server, etc., for providing standard networking functionality. WAP 120 may support one or more WLANs 170 based upon wireless standard(s) which are appropriate for the environment in which WLAN 170 is deployed. Such standards may include, for example, Wi-Fi® (e.g., any IEEE 802.11(x) network, where (x)=a, b, g, n, ac, ad, etc.), such wireless networks may include mesh networks (e.g., IEEE 802.11s), and/or cellular networks, such as, for example, 3GPP (LTE, 4G, 5G, etc.).

CPE 130 may be any type of device which may serve as an interface between WAN 140 and WAP 120 within house 110. CPE 130 may physically connect to WAN 140 over fiber optic cable. Other embodiments may use a different physical connection between WAP 120 and WAN 140, which may include coaxial cables, copper phone lines, and/or cellular wireless access such as 4G, LTE, 5G, etc. Other wireless systems may include satellite communication systems. CPE 130 may include an optical backhaul, an optical networking terminal (ONT), and/or a wireless backhaul (e.g., 4G, LTE, 5G, etc.). In each different communications medium, appropriate types of adaptors, such as an appropriate modem, a cellular hotspot, etc., may be included in CPE 130.

WAN 140 may comprise any combination of large scale, accessible networks, such as, for example, the Internet, an intranet, a service provider network, etc. WAN 140 may be any type of wide area network connecting backhaul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

Network devices 150 may be any type of device attached to WAN 140, such as a computer, a server, a networked sensor, etc., which may exchange data with devices 160 via WLAN 170 and WAN 140. Network device 150 may provide services and/or content and may function, for example, as a web server, a media repository, a streaming source, etc., that may respond to requests to provide any type of content or media to devices 160. Network device 150 may store and provide any type of media, such as, for example, text, audio, image, video, software code, etc.

Devices 160 may include any type of electronic device having wireless communication capabilities, and thus may communicate over WLAN 170 using a variety of different wireless channels. A device 160-$x$ may include, for example, a smart phone, a tablet, a laptop computer, a cellular phone, any type of wireless IP communications device, a Voice over Internet Protocol (VoIP) device, a set-top box, a gaming device, a media player device, or a digital camera that includes wireless communication capabilities. In other embodiments, device 160-$x$ may be any type of input device (e.g., camera, microphone, any form of sensor, security devices, environmental monitors, network appliance, etc.), any type of output device (e.g., monitor, projector, media player, audio controller, etc.), or combination thereof (e.g., network attached storage device, an electronic whiteboard, etc.). A device 160-$x$ may also include any type of machine which may be monitored and/or controlled wirelessly over a network. Accordingly, in non-residential environments, devices 160 may include, for example, medical devices, machines used in manufacturing, machines used in food production and/or agriculture, etc.

WLAN 170 may include one or more wireless networks based upon wireless standard(s) which are appropriate for an environment in a local area network is deployed. Such wireless standards may include, for example, Wi-Fi® (e.g., any IEEE 802.11(x) network, where (x)=a, b, g, n, ac, ad, etc.), ZigBee, etc. In other embodiments, WLAN 170 may include mesh networks (e.g., IEEE 802.11s), and/or 3GPP cellular networks supported by a femto-cell located within house 110, such as, for example, a femto-cell based on 4G, LTE and/or 5G network standards.

Profiler device 180 may include any type network device, such as, for example, a server, computer, access point, router, etc., that may collect measurements from devices 160 over WLAN 170 and/or WAN 140, and generate a profile that characterizes the performance of WLAN 170. As shown in FIG. 1, profiler device 180 may operate remotely with respect to house 110, and thus reside outside WLAN 170 and exchange data through WAN 140. However, in other embodiments (not shown) profiler device 180 may located within house 110, and reside in a device supporting WLAN 170 or another local area network (not shown). Accordingly, profiler device 180 may reside in WAP 120, a device 160-$x$, or a router/switch (not shown). In such an embodiment, a user may initiate the generation profiles without having to contact technical support.

Profile database 190 may be directly attached to profiler device 180 as shown, or operate as a remote network device connected to WAN 140. Profile database 190 may be any suitable database capable of storing large data sets to accommodate the profile histories for a large number of WAPs 120 for all of the users for a given network operator. Profile database 190 may be any type of commercial or open-source database, such as, for example, a relational database using sequel query language (SQL).

Figure 2:
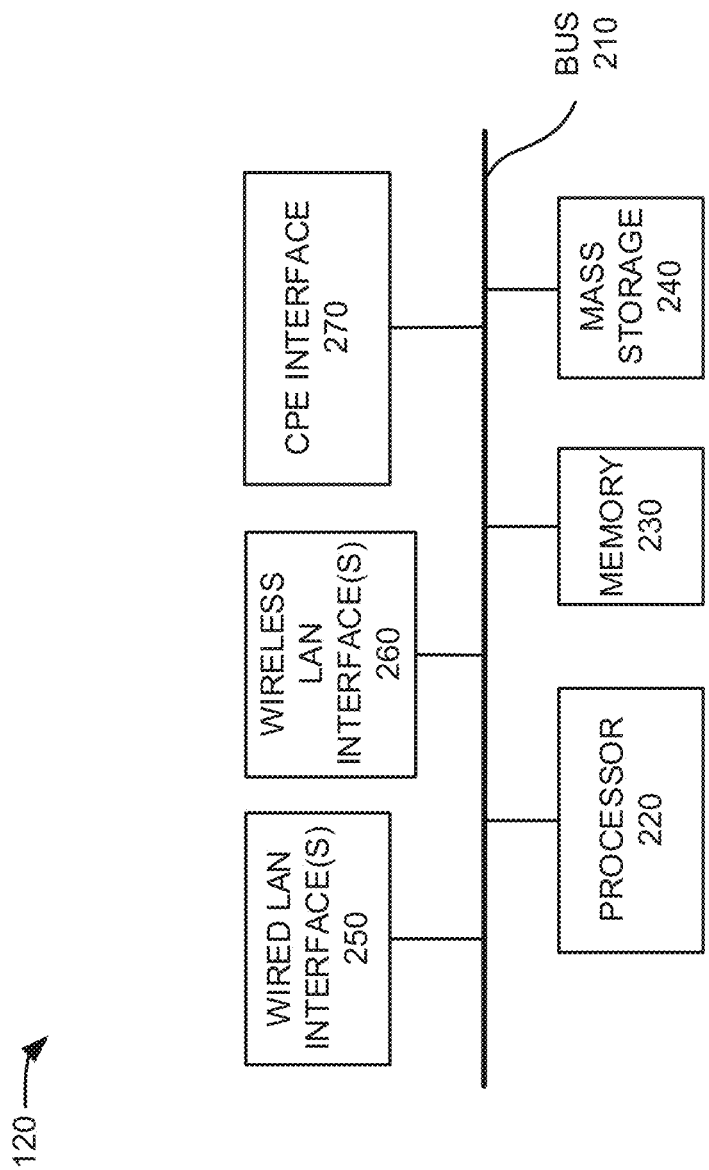
FIG. 2 is a block diagram showing exemplary components of a wireless access point (WAP)

FIG. 2 is a block diagram showing exemplary components of wireless access point (WAP) 120. WAP 120 may include a bus 210, a processor 220, a memory 230, mass storage 240, a wired LAN interface 250, wireless LAN interface(s) 260, and an CPE interface 270.

Bus 210 includes a path that permits communication among the components of WAP 120. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic. For example, the processor 220 may be an x86 based CPU, and may use any operating system, which may include varieties of the Windows, UNIX, and/or Linux. The processor 220 may also use standard software packages, libraries, and/or custom software written in any programming and/or scripting languages for supporting networking functionality for WLAN 170 and interacting with devices 160 that are communicatively coupled to WLAN 170. Additional networking functionality which may be performed by processor 220 so WAP 120 may also serve as, for example, a packet router and/or a switch, a dynamic host configuration protocol (DHCP) server, a firewall, a virtual private network (VPN) server, etc.

Memory 230 may include any type of dynamic storage device that may store information and/or instructions, for execution by processor 220, and/or any type of non-volatile storage device that may store information for use by processor 220. For example, memory 230 may include a RAM or another type of dynamic storage device, a ROM device or another type of static storage device, and/or a removable form of memory, such as a flash memory. Mass storage device 240 may include any type of on-board device suitable for storing large amounts of data, and may include one or more hard drives, solid state drives, and/or various types of redundant array of independent disks (RAID) arrays.

Wired LAN interface(s) 250 can allow WAP 120 to communicate with CPE 130 and/or provide a wired LAN in house 110 (not shown). Wired LAN interface(s) 250 may enable, for example, Ethernet and TCP/IP functionality for communication. Additionally or alternatively, wired LAN interface(s) 250 may provide multimedia over coax alliance (MoCA) functionality for communication via coaxial cable.

Wireless LAN interface(s) 260 may include one or more transceivers that allow WAP 120 to communicate with devices 160 over one or more WLANs 170 in (and around) house 110. WAP 120 may one or more radios that support WLANs 170 based upon wireless standard(s) which are appropriate for the environment in which WLAN 170 is deployed. Such standards may include, for example, Wi-Fi (e.g., any IEEE 802.11(x) network, where (x)=a, b, g, n, ac, ad, etc.). WAP 120 may support mesh networking in accordance with mesh networking standards (e.g., IEEE 802.11s). Additionally or alternatively, in other embodiments, wireless LAN interface 260 may further include transceivers to support cellular networks such as, for example, 3GPP (4G, LTE, 5G, etc.). In such embodiments employing cellular standards, WAP 120 may be realized, for example, as a femto-cell, a cellular hotspot, or other functional network node which may provide cellular connectivity.

CPE interface 270 may provide WAP 120 with the capability to communicate with CPE 130 which acts as a gateway to WAN 140. CPE interface 270 may physically connect to CPE 130 over twisted pair wiring based on the Ethernet protocol. In other embodiments, CPE interface 270 may support coaxial cables as a physical interface to CPE 130.

While FIG. 2 shows exemplary components of WAP 120, in other implementations, WAP 120 may include fewer components, different components, additional components, or differently arranged components than depicted in FIG. 2.

Figure 3:
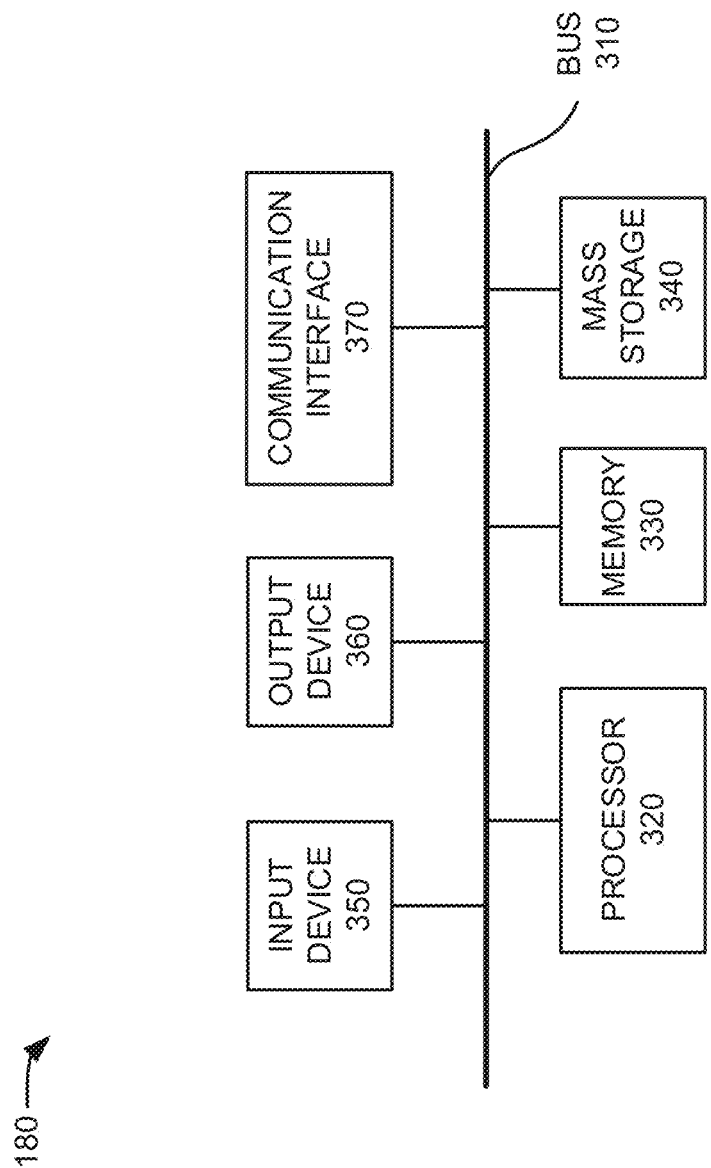
FIG. 3 is a block diagram showing exemplary components of a profiler device.

FIG. 3 is a block diagram showing exemplary components of profiler device 180. Profiler device 180 may include a bus 310, a processor 320, a memory 330, mass storage 340, an input device 350, an output device 360, and a communication interface 370, Bus 310 includes a path that permits communication among the components within profiler device 180. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic. For example, processor 320 may be an x86 based CPU, and may use any operating system, which may include varieties of the Windows, UNIX, and/or Linux. Processor 320 may also use standard software packages, libraries, and/or custom software written in any programming and/or scripting languages for supporting networking functionality for generating profiles for WAP 120 and communicating over WAN 140 and WLAN 170.

Memory 330 may include any type of dynamic storage device that may store information and/or instructions, for execution by processor 320, and/or any type of non-volatile storage device that may store information for use by processor 320. For example, memory 330 may include a RAM or another type of dynamic storage device, a ROM device or another type of static storage device, and/or a removable form of memory, such as a flash memory. Mass storage 340 may include any type of on-board device suitable for storing large amounts of data, and may include one or more hard drives, solid state drives, and/or various types of RAID arrays.

Input device 350 may include one or more mechanisms that permit an operator to input information profiler device 180, such as, for example, a keypad or a keyboard, a microphone, voice recognition, components for a touchscreen, and/or biometric mechanisms, etc. In some embodiments, no input device may be included in profiler device 180 because it may be controlled remotely by a technician over WAN 140.

Output device 360 may output information to a technician. Output device 360 may include a display (such as a liquid crystal display (LCD)), a printer, a speaker, and/or another type of output device. In some embodiments, profiler device 180 may be controlled remotely by a technician and may not include output device 360.

Communication interface 370 may include a transceiver that enables profiler device 180 to communicate (both wired and/or wirelessly) within WAN 140 and WLAN 140 to access CPE 130 and/or network device(s) 150, respectively. Specifically, communication interface 370 may be configured for wireless communications (e.g., Radio Frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 370 may include a logical component that includes input and/or output ports, input and/or output systems, and/or other input and output components that facilitate the transmission/reception of data to/from other devices. For example, communication interface 370 may include a network interface card (e.g., Ethernet card) for wired communications and/or a wireless network interface (e.g., a WiFi) card for wireless communications. Communication interface 370 may also include a Universal Serial Bus (USB) port for communications over a cable, a Bluetooth® wireless interface, a Radio Frequency Identification (RFID) interface, a Near Field Communication (NFC) wireless interface, and/or any other type of interface that converts data from one form to another form.

Profiler Device 180 may perform certain operations relating profiling WAP 120 to quantitatively assess the performance of WLAN 170. Profiler Device 180 may perform these operations in response to processor 320 executing software instructions contained in a computer-readable medium, such as memory 330 and/or mass storage 340. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of profiler device 180, in other implementations, profiler device 180 may include fewer components, different components, additional components, or differently arranged components than depicted in FIG. 3.

Prior to describing process 400 which is described below in relation to FIG. 4, details of an embodiment for mathematically determining a profile characterizing the performance of WLAN 170 will be described. As provided above, profiler device 180 may collect various performance metrics from WAP 120 as inputs which may be received over WAN 140. The inputs may be processed as described below to produce the profile.

One type of input which may be received by profiler device 180 is a measurement of the power received by WAP 120 from the signals transmitted by devices 160. In an embodiment, the measurement of the received power may be an RSSI value from each device 160. The RSSI may be defined as the relative received signal strength associated with a wireless connection. The RSSI may be a numerical value provided in arbitrary units. The RSSI may be an indication of the power level being received by the WAP 120 after the antenna and cable loss. Accordingly, the higher the RSSI number, the stronger the signal. Once the RSSI value is received for a particular connection, the RSSI value may be categorized as a qualitative signal level category which takes into account the bandwidth associated with the channel connection, where the bandwidth may be a function of the IEEE WiFi standard that is being used to support that channel.

In an embodiment, an exemplary framework for categorizing RSSI measurements may be as follows, where the signal level categories are designated as colors "Green," "Yellow," and "Red:"

20 MHz: Green is >=−66; Yellow<−66 to >=−74; Red is <−74;

40 MHz: Green is >=−63; Yellow<−63 to >=−71; Red is <−71; and

80 MHz: Green is >=−60; Yellow<−60 to >=−68; Red is <−68.

In other embodiments, different signal level categories may be designated to characterize the RSSI value based on bandwidth and/or other wireless parameters. In some instances, the categories may be numerical values.

Another type of input which may be received by profiler device 180 is the modulation coding scheme (MCS) index. The MCS index may be based on a lookup table which is part of a given wireless standard (e.g., WiFi, 4G, LTE, 5G, etc.). The MCS index in a lookup table may map to a number of parameters that indicate the quality of the wireless connection. The parameters may include the data rate, the number of spatial streams used in a channel, the modulation type (e.g. binary phase shift keying (BPSK), quadrature phase shift keying (QPSK), N-quadrature amplitude modulation (N-QAM), where N=16, 64), and the coding rate (where the coding rate is an indication of how much of the data stream is actually being used to transmit usable data). Based on the MCS index and one or more of its associated parameters in the lookup table, a modulation rate ratio may be computed to provide an indication of the quality of a wireless connection. The modulation rate ratio can indicate the quality of the wireless connection independent of the RSSI value. For example, while a connection may have a high RSSI value (i.e., the signal is strong), the channel quality may still be poor if sources of radio interference (e.g., neighboring WAPs) are present and are strong enough to significantly degrade the connection. The modulation rate ratio will indicate a quality of the connection which considers the effect of any competing interference signals. The modulation rate ratio may be determined by dividing a current modulation rate by a maximum modulation rate. The current modulation rate is negotiated between WAP 120 and devices 160, and ascertained from the MCS index. The maximum modulation rate is based on the WiFi standard being used by the radio in WAP 120. Once the modulation rate ratio is calculated, the value may be categorized into a qualitative category which takes into account the IEEE WiFi standard (e.g., 802.11x, x=a, b, g, n, ac).

In an embodiment, an exemplary framework for categorizing the modulation rate ratio values based on WiFi wireless standards 802.11x, x=a, b, g, n, and ac may be as follows, where channel connection categories are designated as colors "Green," "Yellow," and "Red:"

802.11B, 802.11G: Green is >67%; Yellow>=33% and =<67%; Red is <33%;

802.11N: Green is >=50%; Yellow>=30% and =<50%; Red is <30%; and 802.11AC: Green>=50%; Yellow>=30% and =<50%; Red is <30%.

Profiler device 180 may also determine the dominance of each device 160 which emphasizes the devices 160 which consume the most data. As noted above, in one embodiment, the dominance of a device 160-$x$ may be calculated by determining the packet counts transmitted to each device as a ratio of the total number of packets transmitted by each radio in WAP 120. In other embodiments the packets counted for determining device dominance may be based the number of packets received by devices 160, or the number of packets exchanged (transmitted and received) by devices 160.

Once the device dominance for each device is calculated, and the categories for the RSSI and the modulation rate ratio are determined, the categories may be transformed into numerical values (which may also be referred to herein as a RSSI score and a modulation rate score). Specifically, in one embodiment, a unit less RSSI_score and a unit less Modulation_Rate_Score may be mapped or generated, for example, by transformations shown below:

Green: translated to 100;
Yellow: translated to 75; and
Red: translated to 50.

In an embodiment, once the RSSI_score and the Modulation_Rate_Score are determined, a profile of WLAN 170 may be generated as follows:

$$\text{Profile} = \sum_{i=1}^{N} \text{Device\_Dom}_i * \left( \frac{\max(\text{TX\_Mod\_Rate\_Score}_i, \text{RX\_Mod\_Rate\_Score}_i) + \text{RSSI\_score}_i}{2} \right), \quad \text{(Eq. 1)}$$

where:
i: index corresponding to Device 160-$i$;
N: total number of Devices 160 in WLAN 170;
Device_Dom$_i$: dominance of Device 160-$i$, which may be calculated by the following equation:

$$\text{Device\_Dom}_i = \frac{\text{Number of packets Transmitted to Device}_i}{\text{Total Number of Packets Transmitted by } WAP};$$

Tx_Mod_Rate_Score$_i$: transmit Modulation_Rate_Score for Device 160-$i$;
Rx_Mod_Rate_Score$_i$: receive Modulation_Rate_Score for Device 160-$i$; and
RSSI_Score$_i$: RSSI_score for Device 160-$i$.

A Profile or score may be rated based on the following thresholds:

Profile>90 GOOD;
80<Profile<89: FAIR, and
Profile<80: POOR.

The following may be inferred from the above profile scores. A score rated as "GOOD" indicates that coverage for WLAN 170 is excellent for where the services are being used. A score rated as "FAIR" indicates that coverage for WLAN 170 is adequate for where the services are being used, however there is room for improvement. A score rated as "POOR" indicates there are opportunities to improve the coverage of WLAN 170 within house 110. Upon receiving a profile mapping to the "POOR" designation, action may be taken to improve network performance. Such action may include, for example, relocating and/or reorienting WAP 120, installing a WiFi extender, and/or altering the operating parameters of WAP 120 or modifying WAP 120 hardware in some manner (e.g., adding an external antenna).

Figure 4:
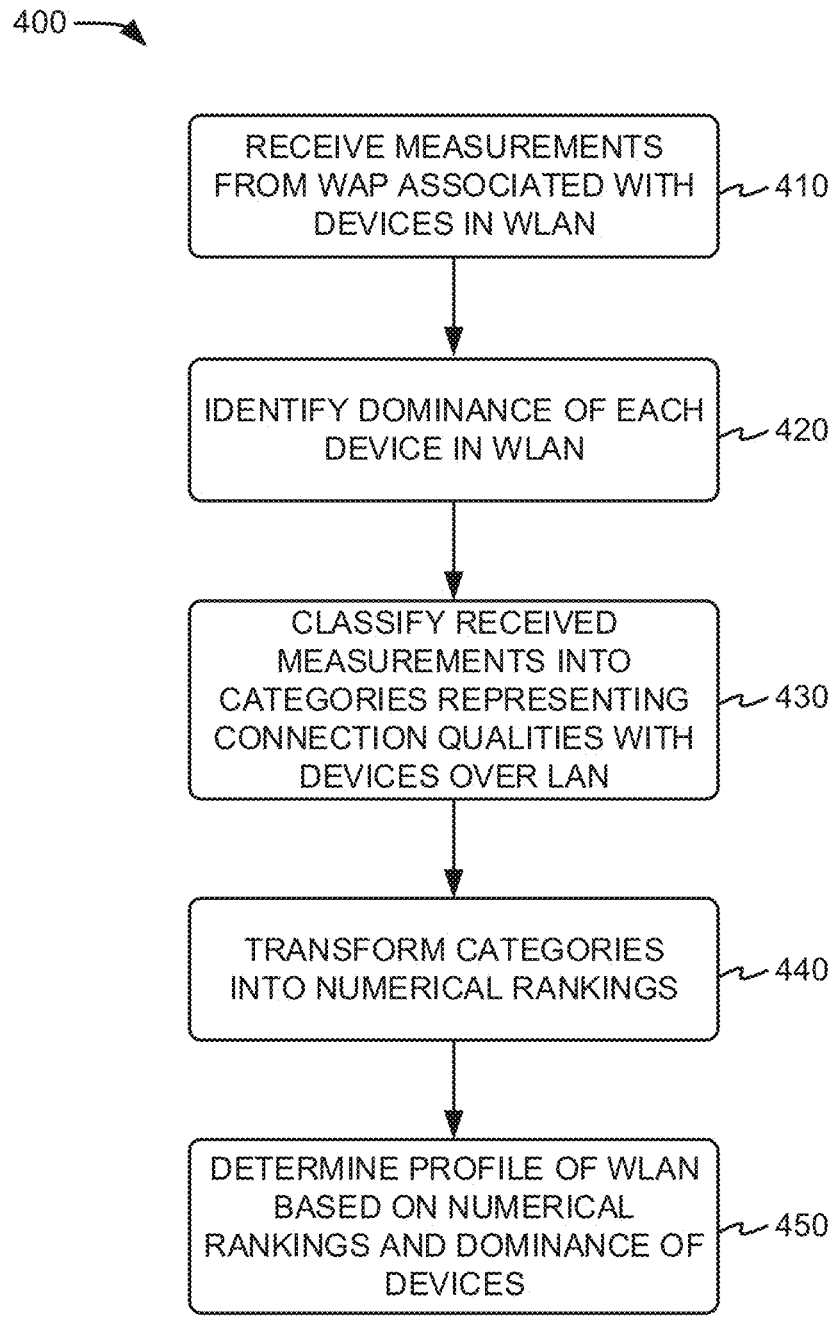
FIG. 4 is a flow diagram of an exemplary process for determining a profile of a wireless local area network.

FIG. 4 is a flow diagram of an exemplary process 400 for determining a profile of a WLAN 170. Process 400 may be performed by profiler device 180, for example, by executing instructions on processor 320 which may be stored in memory 330. Initially, profiler device 180 may receive measurements from WAP 120 associated with devices 160 in a WLAN 170 (Block 410). In an embodiment, profiler device 180 may receive a received signal strength indication (RSSI) and a modulation coding scheme associated each device 160.

Profiler device 180 may identify a dominance of devices 160 in WLAN 170 (Block 420). In an embodiment, profiler device 180 may identify the dominance for each device 160-$x$ by determining ratios of the number of packets transmitted to each device 160-$x$ to a total number of packets transmitted by WAP 120 to all the devices 160 in the WLAN 170. In another embodiment, profiler device 180 may identify the dominant device by selecting manually (by the technician or the user) at least one of the devices 160, and then assigning a dominance value for the selected devices. Other embodiments for identifying the dominance for each device may be based on packets received by WAP 120 from each device 160-$x$, or the number of packets exchanged between WAP 120 and each device 160-$x$ (i.e., both transmitted and received). Profiler device 180 may then classify the received measurements into categories representing channel qualities with devices 160 in WLAN 170 (Block 430). In an embodiment, profiler device 180 may classify the received measurements into categories by assigning a signal level category based on the RSSI and a frequency associated with the received signal. In another embodiment, profiler device 180 may classify the received measurements into categories by calculating a modulation rate ratio by dividing a current modulation rate by a maximum modulation rate. The current modulation rate may be based on the received modulation coding scheme associated with each device 160. Profiler device 180 may then assign a channel connection category based on the modulation rate ratio and a wireless standard associated with the received signal.

Profiler device 180 may transform the categories of the devices 160 into values (which are also referred to herein as scores) (Block 440). In an embodiment, profiler device 180 may transform the categories into values by determining an RSSI score based on the assigned signal level category. Profiled device 180 may also determine a modulation rate score based on the assigned channel connection category.

Profiler device 180 may then determine a profile of WLAN 170 based on the values and the dominance of each device 160, for example, as provided Eq. 1 above (Block 450). For example, in an embodiment, profiler device 180 may determine the profile of the WAP by calculating a first modulation rate ratio associated with packets received by WAP 120 from each device 160 and calculating a second modulation rate ratio associated with packets transmitted from WAP 120 to each device 160. Profiler device 180 may then select a larger of the first modulation rate ratio and the second modulation rate ratio to determine a maximum modulation rate ratio for each device 160. Profiler device 180 may further calculate an average of the maximum modulation rate ratio and a value associated with RSSI for each device 160-$x$, and then compute a weighted sum of the average for each device 160-$x$. In an embodiment, the weighting is based on the dominance of each device 160-$x$.

Figure 5:
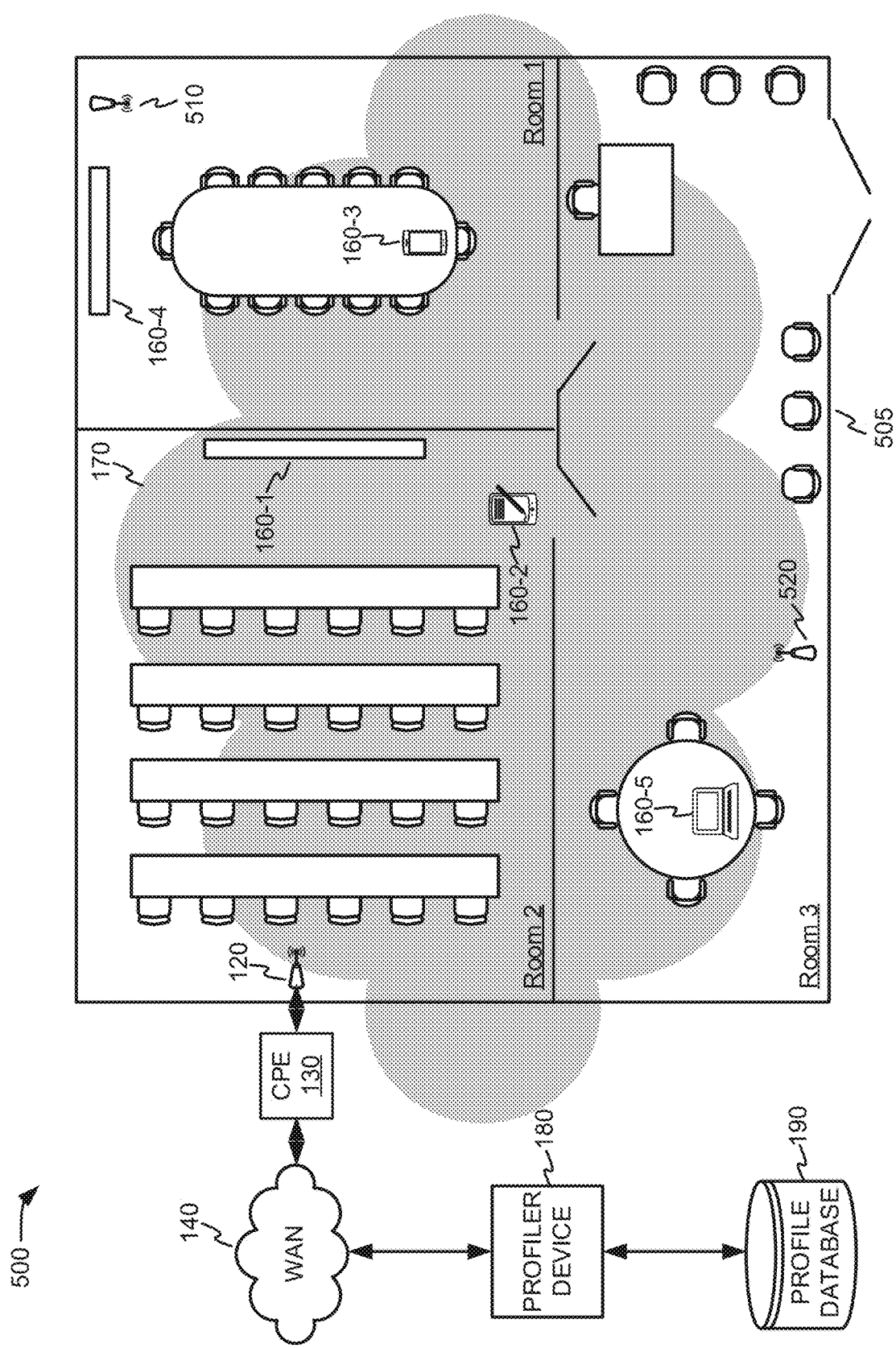
FIG. 5 is a is a diagram illustrating another exemplary environment within an office consistent with an embodiment.

FIG. 5 is a diagram illustrating another exemplary environment 500 within an office for which a profile of WLAN 170 may be determined. The following description will illustrate an example of how profiler device 180 may analyze and improve WLAN 170 performance in environment 500. In this example, profiler device 180 determined two profiles for WLAN 170 during separate Trials A and B where profiler device 180 was invoked manually by a technician. During Trial A, WAP 120 was functioning normally and wireless extenders 510 and 520 were deactivated. During Trial B, WAP 120 remained functional while wireless extenders 510 and 520 were activated. FIGS. 6A and 6B display tables showing RSSI values and modulation rate ratios for the devices 160-1 through 160-5 for each Trial. FIG. 6C displays a table showing the average of the maximum modulation rate score and the RSSI_score weighted by the device dominance for devices 160-1 through 160-5. These values represent the argument of the summation in Eq. 1 provided above. In the last column of the table in FIG. 6C, the profiles of WLAN 170 for both Trials A and B are shown. These profiles are the sum of each row of the table in FIG. 6C for devices 160-1 through 160-5.

Environment 500 includes a floor plan 505 that may include separate rooms providing different functions. The rooms may have devices 160-1 through 160-5 distributed throughout which communicate over WLAN 170, where some devices 160 may be mobile, and some devices 160 may be fixed within a particular room. Room 1 may correspond to a conference room with a conference table as shown, and includes wireless extender 510 and device 160-3 and 160-4. Device 160-4 may be a large screen monitor which can display presentations wirelessly provided by a meeting attendee using device 160-3 (e.g., a smartphone). Room 2 may correspond to a classroom with an exemplary array of chairs as shown, and include WAP 120 and device 160-1 and 160-2. Device 160-1 may be an interactive presentation device such as an electronic whiteboard, which may able to display data provided by a device 160-2 having appropriate authorization. The electronic whiteboard may further receive commands provided by a student proximate to the whiteboard's surface to draw shapes and/or manipulate displayed objects. The visual information provided by the presenter and the student may be combined and sent to other devices belonging to students attending class in Room 2. Room 3, which can be a lobby having chairs and tables to accommodating individuals waiting for entry into the classroom in Room 2 or the conference room in Room 1. Room 3 may include wireless extender 520 and device 160-5.

Device 160-5 may be a network attached file server which provide materials which may be accessed prior to entering Room 2 and Room 3.

When profiler device 180 determines the profile of WLAN 170 during Trial A, WAP 120 is active and wireless extenders 510 and 520 are deactivated. Device 160-3 is manually designated by the technician operating profiler device 180 as being the most dominant device since it belongs to the owner of the business occupying the office. For Trial A, FIG. 6A shows a table of the RSSI values for devices 160-1 through 160-5. In Trial A, devices 160-1 and 160-2, which are closest to WAP 120, have the highest RSSI values. Devices 160-3 and 160-4 have the lowest RSSI values given their large distance from WAP 120. Moreover, because device 160-3 is electromagnetically shielded or partially blocked by device 160-1 (the electronic whiteboard), WAP 120 reports device 160-3 as having the lowest RSSI value. FIG. 6B, which shows the modulation rate ratio of devices 160, shows device 160-3 as having the lowest modulation rate ratio given the effect of device 160-1 blocking the wireless channel between WAP 120 and device 160-3.

When profiler device 180 determines the profile of WLAN 170 during Trial B, WAP 120 is active and wireless extenders 510 and 520 are activated. Thus, for Trial B, FIG. 6A shows that the RSSI values for devices 160-3 and 160-4 have improved significantly, as wireless extender 510 has been tuned to operate with a high gain given the relative importance of the occupants during meetings in Room 1. Additionally, device 160-5 also improved significantly in Trial B given the close proximity of wireless extender 520. However, RSSI values for devices 160-1 and 160-2 remained approximately the same, as the wireless extenders 510, 520 had little effect on the power of the signals received by WAP 120 from devices 160-1 and 160-2. For Trial B, the modulation rate ratio of devices 160-3 and 160-4 improved significantly as shown in FIG. 6B because device 160-1 was no longer blocking the wireless channels for devices 160-3 and 160-4. The modulation rate ratio also improved for device 160-5 given the proximity and free line of sight to wireless extender 520. However, the modulation rate ratio for devices 160-1 and 160-2 during Trial B was slightly reduced from Trial A due to the small level of wireless interference between WAP 120 and devices 160-1 and 160-2 caused by wireless extenders 510 and 520. As can be seen from FIG. 6C, the profile for WLAN 170 improved significantly in Trial B from 78 to 100. This is in large part due to the significant improvement (from 36 to 52) in the average of the maximum modulation rate score and the RSSI score (weighted by the device dominance) of device 160-3. This improvement for device 160-3, which is the result of the large improvement RSSI for device 160-3 shown in FIG. 6A, the large improvement in modulation rate ratio of device 160-3 shown in FIG. 6B, and the fact the device 160-3 was selected to be the dominant device (i.e., have the largest dominance value).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 4, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code. It being understood that software and control hardware can be designed to implement these aspects based on the description herein.

Further, certain portions of the invention may be implemented as a "component" or "system" that performs one or more functions. These components/systems may include hardware, such as a processor, an ASIC, a FPGA, or other processing logic, or a combination of hardware and software. Moreover, certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   receiving, from a wireless access point (WAP), measurements associated with a plurality of client devices in a wireless local area network (WLAN);

assigning first values representing weighting values to the client devices in the WLAN, wherein the assigning first values comprises:

determining, based on the WAP measurements, ratios of the number of packets transmitted to each client device of the plurality of client devices to a total number of packets transmitted by the WAP, wherein the determined ratio for each respective client device of the plurality of client devices corresponds to the assigned first value for the respective client device;

classifying the received measurements into categories representing channel qualities with the client devices in the WLAN;

transforming the categories of the client devices into second values; and determining a profile of the WLAN based on the first values and the second values, wherein determining the profile of the WLAN comprises:

calculating a first modulation rate score associated with packets received from each client device of the plurality of client devices, calculating a second modulation rate score associated with packets transmitted to each client device of the plurality of client devices, selecting a larger of the first modulation rate score and the second modulation rate score to determine a maximum modulation rate score for each client device of the plurality of client devices, calculating an average of the maximum modulation rate score and a received signal strength indication (RSSI) score for each client device of the plurality of client devices, and computing a weighted sum of the averages of the client devices.

2. The method of claim 1, wherein the receiving the measurements comprises:

receiving the RSSI and a modulation coding scheme associated with each client device of the plurality of client devices.

3. The method of claim 2, wherein the classifying the received measurements into categories further comprises:

assigning a signal level category based on the RSSI and a frequency associated with the received signal.

4. The method of claim 3, wherein classifying the received measurements into categories further comprises:

calculating a modulation rate ratio by dividing a current modulation rate by a maximum modulation rate, wherein the current modulation rate is based on the received modulation coding scheme associated with each client device of the plurality of client devices; and assigning a channel connection category based on the modulation rate ratio and a wireless standard associated with the received signal.

5. The method of claim 4, wherein transforming the categories of the client devices into second values further comprises:

determining the RSSI score based on the assigned signal level category; and determining a modulation rate score based on the assigned channel connection category.

6. The method of claim 5, wherein determining the profile of the WLAN further comprises:

periodically generating the profile of the WLAN.

7. The method of claim 1, wherein assigning first values comprises:

determining the total number of packets transmitted by the WAP to all the client devices in the WLAN.

8. The method of claim 1, wherein the assigning first values further comprises:

manually selecting at least one of the client devices; and assigning a first value for the at least one selected client device.

9. A profiler device, comprising:

a network interface for exchanging data over a network; and a processor, coupled to the network interface, configured to execute the instructions stored in a memory to:

receive, from a wireless access point (WAP), measurements associated with a plurality of client devices in a wireless local area network (WLAN), assigning first values representing weighting values to the client devices in the WLAN, wherein the assigning first values comprises:

determining, based on the WAP measurements, ratios of the number of packets transmitted to each client device of the plurality of client devices to a total number of packets transmitted by the WAP, wherein the determined ratio for each respective client device of the plurality of client devices corresponds to the assigned first value for the respective client device, classify the received measurements into categories representing channel qualities with the client devices in the WLAN, transform the categories of the client devices into second values, and determine a profile of the WLAN based on the first values and the second values, wherein the instructions to determine the profile of the WLAN further cause the processor to:

calculate a first modulation rate score associated with packets received from each client device of the plurality of client devices, calculate a second modulation rate score associated with packets transmitted to each client device of the plurality of client devices, select a larger of the first modulation rate score and the second modulation rate score to determine a maximum modulation rate score for each client device of the plurality of client devices, calculate an average of the maximum modulation rate score and a received signal strength indication (RSSI) score for each client device of the plurality of client devices, and compute a weighted sum of the averages of the client devices.

10. The profiler device of claim 9, wherein the instructions to receive the measurements further cause the processor to:

receive the RSSI and a modulation coding scheme associated with each client device of the plurality of client devices.

11. The profiler device of claim 10, wherein the instructions to classify the received measurements further cause the processor to:

assign a signal level category based on the RSSI and a frequency associated with the received signal.

12. The profiler device of claim 11, wherein the instructions to classify the received measurements further cause the processor to:

calculate a modulation rate ratio by dividing a current modulation rate by a maximum modulation rate, wherein the current modulation rate is based on the received modulation coding scheme associated with each client device of the plurality of client devices; and assign a channel connection category based on the modulation rate ratio and a wireless standard associated with the received signal.

13. The profiler device of claim 12, wherein the instructions to transform the categories of the client devices into second values further cause the processor to:

determine the RSSI score based on the assigned signal level category; and determine a modulation rate score based on the assigned channel connection category.

14. The profiler device of claim 13, wherein the instructions to determine the profile of the WLAN further cause the processor to:

periodically generate the profile of the WLAN.

15. The profiler device of claim 9, wherein the instructions to assign first values further cause the processor to:

determine the total number of packets transmitted by the WAP to all of the plurality of client devices in the WLAN.

16. The profiler device of claim 9, wherein the instructions to assign first values further cause the processor to:

select at least one of the client devices, and assign a first value for at least one selected client devices.

17. A non-transitory computer-readable medium comprising instructions, when executed by a processor, cause the processor to:

receive, from a wireless access point (WAP), measurements associated with a plurality of client devices in a wireless local area network (WLAN);

assign first values representing weighting values to the client devices in the WLAN, wherein the assigning first values comprises:

determining, based on the WAP measurements, ratios of the number of packets transmitted to each client device of the plurality of client devices to a total number of packets transmitted by the WAP, wherein the determined ratio for each respective client device of the plurality of client devices corresponds to the assigned first value for the respective client device;

classify the received measurements into categories representing channel qualities with the client devices in the WLAN;

transform the categories of the client devices into values; and determine a profile of the WLAN based on the first values and the second values, wherein when determining the profile of the WLAN, the instructions further cause the processor to:

calculate a first modulation rate score associated with packets received from each client device of the plurality of client devices, calculate a second modulation rate score associated with packets transmitted to each client device of the plurality of client devices, select a larger of the first modulation rate score and the second modulation rate score to determine a maximum modulation rate score for each client device of the plurality of client devices, calculate an average of the maximum modulation rate score and a received signal strength indication (RSSI) score for each client device of the plurality of client devices, and compute a weighted sum of the averages of the client devices.

18. The non-transitory computer-readable medium of claim 17, wherein the instructions to receive the measurements further cause the processor to:

receive the RSSI and a modulation coding scheme associated with each client device of the plurality of client devices.

19. The non-transitory computer-readable medium of claim 18, wherein the instructions to classify the received measurements further cause the processor to:

assign a signal level category based on the RSSI and a frequency associated with the received signal.

20. The non-transitory computer-readable medium of claim 18, wherein the instructions to classify the received measurements further cause the processor to:

calculate a modulation rate ratio by dividing a current modulation rate by a maximum modulation rate, wherein the current modulation rate is based on the received modulation coding scheme associated with each client device of the plurality of client devices; and assign a channel connection category based on the modulation rate ratio and a wireless standard associated with the received signal.

* * * * *